No. 624,264. Patented May 2, 1899.
G. THOMAS.
VEHICLE RUNNING GEAR.
(Application filed Feb. 28, 1898.)
(No Model.)
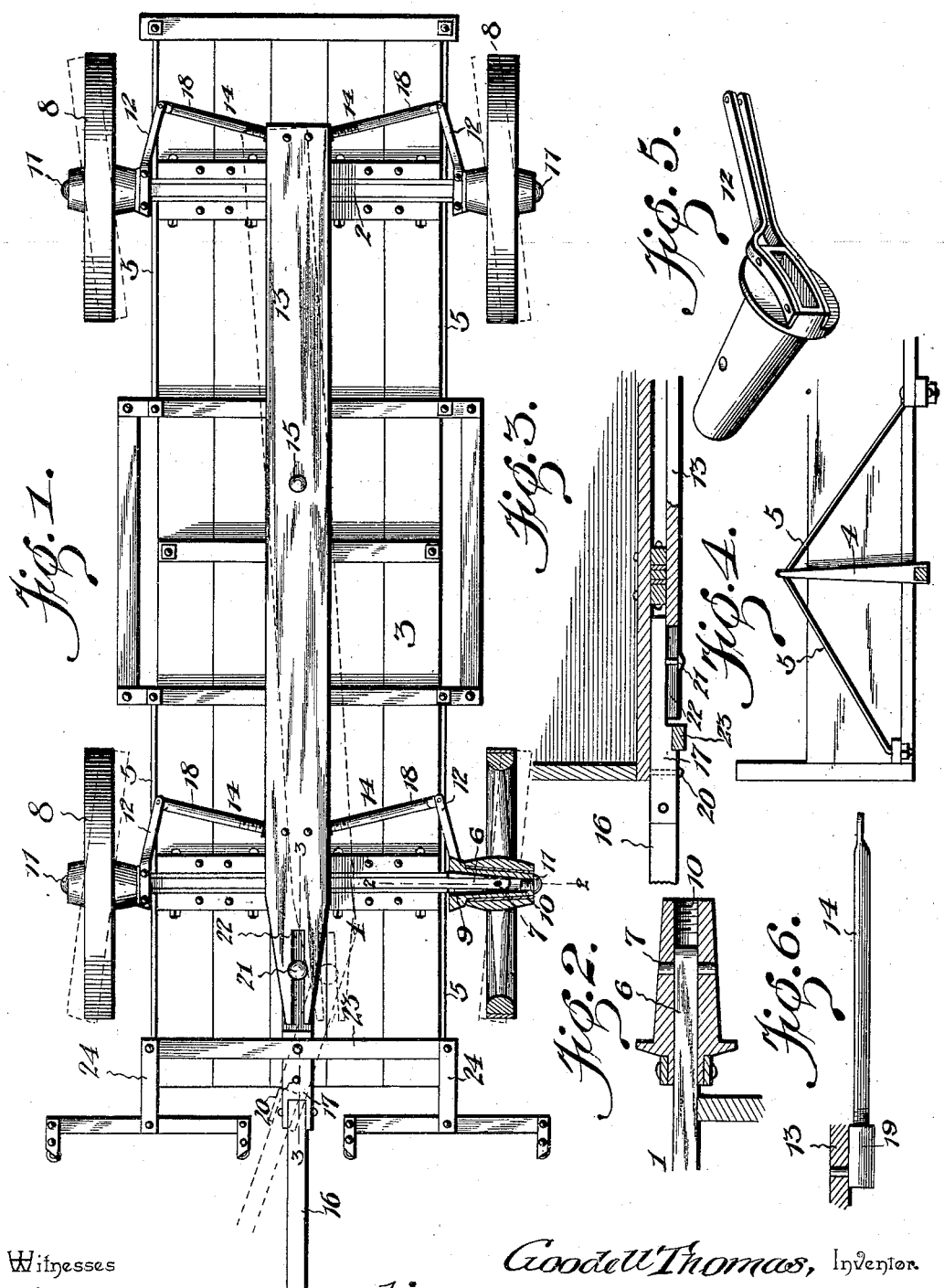
Witnesses
N. Roy Appleman
T. F. F. Riley
Goodell Thomas, Inventor.
By his Attorneys,
C. A. Snow & Co.
THE NORRIS PETERS CO., PHOTO-LITHO., WASHINGTON, D. C.

UNITED STATES PATENT OFFICE.

GOODELL THOMAS, OF HECLA, NEW YORK.

VEHICLE RUNNING-GEAR.

SPECIFICATION forming part of Letters Patent No. 624,264, dated May 2, 1899.

Application filed February 28, 1898. Serial No. 672,007. (No model.)

*To all whom it may concern:*

Be it known that I, GOODELL THOMAS, a citizen of the United States, residing at Hecla Works, in the county of Oneida and State of New York, have invented a new and useful Running-Gear, of which the following is a specification.

The invention relates to improvements in running-gear.

The object of the present invention is to improve the construction of running-gear and to provide a simple, inexpensive, and efficient one in which the rear wheels will turn similar to the front wheels in turning a vehicle, so that the said wheels will follow each other perfectly to enable a vehicle to be turned completely within a short space and without liability of upsetting it.

A further object of the invention is to arrange the running-gear so that if a front wheel contacts with a stone or other obstruction it will not operate to swing the tongue laterally like in an ordinary running-gear.

The invention consists in the construction and novel combination and arrangement of parts, as hereinafter fully described, illustrated in the accompanying drawings, and pointed out in the claims hereto appended.

In the drawings, Figure 1 is a reverse plan view, partly in section, of a vehicle provided with a running-gear constructed in accordance with this invention. Fig. 2 is a detail sectional view on line 2 2 of Fig. 1. Fig. 3 is a similar view on line 3 3 of Fig. 1. Fig. 4 is a side elevation of a portion of the wagon-body, illustrating the construction for bracing the axles. Fig. 5 is a detail perspective view of one of the spindles or skeins, showing the arm thereof. Fig. 6 is a detail view illustrating the manner of connecting the links with the reach.

Like numerals of reference designate corresponding parts in all the figures of the drawings.

1 and 2 designate front and rear axles rigidly secured to a wagon-body 3 and provided with upwardly-extending arms 4, arranged at the outer faces of the sides of the wagon-body and supported by truss-rods 5, having oppositely-inclined portions extending upward from cleats of the bottom of the wagon-body to the upper ends of the arms or standards 4. The braces or truss-rods 5 support the wagon-body and rigidly connect the arms or standards 4 with the same and assist in strengthening the connection between the axles and the wagon-body.

The ends of the axles project beyond the sides of the wagon-body and have spindles 6 mounted upon them, and consisting, preferably, of skeins pivoted by pins 7 or other suitable fastening devices to the axles, and the pins, which are arranged vertically, are located at points between the ends of the spindles and are disposed opposite the centers of the treads of the wheels 8, whereby should the wheels strike a stone or other obstruction the force of the blow will not operate to turn the spindles on the axles. The inner portions of the openings of the spindles or skeins are tapering and increase in width toward the inner ends of the skeins or spindles, and the tapering openings 9 permit the said spindles or skeins to turn on the vertical pivots 7.

The inner ends of the spindles or skeins are provided with collars or enlargements, and the outer portions of the openings of the skeins or spindles are threaded at 10 and receive screws 11, having enlarged heads and serving to retain the wheels on the spindles or skeins similar to an ordinary axle-nut.

The skeins or spindles are provided at their inner ends with arms 12, extending rearward and connected with a reach 13 by links 14, and the said reach is pivoted between its ends at 15 and is connected with a tongue or pole 16 by a pivoted bar 17, whereby when the tongue or pole is swung laterally of the vehicle incident to turning the same the front wheels will be moved in the direction of the tongue and the rear wheels will be correspondingly moved in the opposite direction, as clearly shown in dotted lines in Fig. 1 of the accompanying drawings, to cause the wheels to track perfectly, so that a vehicle may be turned short without liability of upsetting it. The links, which are pivoted at their inner ends to the reach and at their outer ends to the arms 12, preferably consist of adjustable sections, so that the parts may be properly adjusted at any time. The outer section 18 of the link 14 consists of a rod, which may be either tubular or solid, and the inner section 19, which is adjustable on the outer section, consists of a sleeve, which is interiorly threaded to engage screw-threads of the inner end of the outer section. The sleeve is provided with a pivot, which is arranged in a perforation of the reach. The arms 12, which may be constructed in any suitable manner, preferably consist of a strip of metal doubled on itself to provide a clip and secured to the inner end of the spindle or skein.

By connecting the link-rods 14 with the reach at opposite sides of the pivot 15 the wheels are simultaneously moved in opposite directions to cause the front wheels to follow the pole or tongue and the rear wheels to point in the opposite direction, so that they will act properly. The bar 17, which is disposed longitudinally of the wagon-body, is pivoted between its ends at 20 and is provided in rear of the pivotal point with a headed stud or projection 21, arranged in a longitudinal slot 22 of the front end of the reach. When the tongue is swung from one side to the other, the headed stud or projection 21 moves in the slot 22, but any form of connection may be employed at this point.

The doubletree 23 of the running-gear is pivotally mounted on the bar 17 and is located in rear of the front end of the wagon-body, its ends being connected with the singletree by bars or links 24, which locate the singletrees in advance of the wagon-body.

The invention has the following advantages: The running-gear, which is simple and comparatively inexpensive in construction, possesses great strength and durability and enables a wagon-body to set low on the axles, and the connection between the spindles or axle-skeins causes the front and rear spindles to be simultaneously turned on their pivots when the pole or tongue is swung to one side, whereby a vehicle may be turned in a very short space without upsetting it. By mounting the pivots of the spindles opposite the centers of the treads of the wheels the running-gear is not affected by reason of the wheels striking against a stone or other obstruction, and the force of such a blow will not swing the tongue to one side. The inner ends of the links are arranged between the reach and the bottom of the wagon-body, and this arrangement prevents the inner pivots from becoming accidentally disengaged from the perforations of the reach.

Changes in the form, proportion, and minor details of construction, such as varying the manner of connecting the axles with the body of a vehicle and the like, may be resorted to without departing from the spirit or sacrificing any of the advantages of this invention.

What I claim is—

1. In a device of the class described, the combination of a vehicle-axle, a tapering vehicle-spindle provided at its inner end with a collar or enlargement and pivotally mounted at a point between its ends on the axle and arranged to swing horizontally, an arm disposed longitudinally of the running-gear and connected with the spindle at the collar or enlargement thereof, a wheel arranged on the spindle, and operating mechanism connected with the said arm, substantially as described.

2. In a device of the class described, the combination with front and rear axles, of spindles mounted thereon and pivoted between their ends, a longitudinal reach-bar pivoted between its ends, and connections between the spindles and the reach, substantially as described.

3. In a device of the class described, the combination of front and rear axles, pivotally-mounted spindles having arms, a reach disposed longitudinally of the running-gear and pivoted between its ends, and links connecting the arms of the spindles with the reach, substantially as described.

4. In a device of the class described, the combination of front and rear axles, pivoted spindles provided with arms, a longitudinal reach-bar pivoted between its ends, links connecting the reach with the arms of the spindles, a pole, and a pivoted bar carrying the pole and connected with the front end of the reach, substantially as described.

5. In a device of the class described, the combination of front and rear axles, spindles pivoted at the ends of the axles, a longitudinal reach-bar pivoted between its ends and provided at its front end with a slot, connections between the reach-bar and the spindles, the pivoted bar 17 engaging the slot of the reach-bar, and a pole connected with the pivoted bar, substantially as described.

6. In a device of the class described, the combination with a wagon-body, of an axle secured to the same and provided with standards located at the sides of the wagon-body, and the oppositely-inclined truss-rods extending from the bottom of the wagon-body to the upper ends of the standards, substantially as described.

In testimony that I claim the foregoing as my own I have hereto affixed my signature in the presence of two witnesses.

GOODELL THOMAS.

Witnesses:
JOHN H. SIGGERS,
FRANCES PEYTON SMITH.